United States Patent [19]

Bergström

[11] Patent Number: 4,639,398

[45] Date of Patent: Jan. 27, 1987

[54] COMPOUND FILM CONTAINING OLEFIN

[75] Inventor: Christer Bergström, Helsinki, Finland

[73] Assignee: NESTE OY, Finland

[21] Appl. No.: 653,230

[22] PCT Filed: Feb. 17, 1983

[86] PCT No.: PCT/FI83/00013

§ 371 Date: Sep. 13, 1984

§ 102(e) Date: Sep. 13, 1984

[87] PCT Pub. No.: WO84/03240

PCT Pub. Date: Aug. 30, 1984

[51] Int. Cl.$^4$ .............. B32B 27/32; B32B 13/12; B32B 27/08; C08L 51/06
[52] U.S. Cl. ..................... 428/451; 428/448; 428/483; 428/476.9; 428/476.1; 428/576; 428/476.3; 428/35; 525/12; 264/176.1
[58] Field of Search ............ 428/451, 447, 448, 516, 428/483, 476.9, 476.1; 525/12

[56] References Cited

U.S. PATENT DOCUMENTS 4,395,459 7/1983 Herschdorfer et al. ............ 428/451

FOREIGN PATENT DOCUMENTS 2100188 12/1982 United Kingdom .

OTHER PUBLICATIONS

Chemical Abstracts, vol. 94, p. 38 (1981).
Chemical Abstracts, vol. 96, p. 55 (1982).
Chemical Abstracts, vol. 85, p. 62 (1976).
Patent Abstract of Japanese Application No. 54-61274.

Primary Examiner—P. C. Ives
Attorney, Agent, or Firm—Steinberg & Raskin

[57] ABSTRACT

Compound film containing polyolefin. Such a compound film comprises at least one polyolefin layer having good adhesiveness to polymers containing polar radicals. In order to make the adhesive polyolefin layer such that the adhesive layer contains no substances detrimental to health, the adhesive layer in the compound film of the invention consists of polyolefin which has been modified by grafting 0.01 to 10% of unsaturated alkoxysilane.

20 Claims, 1 Drawing Figure

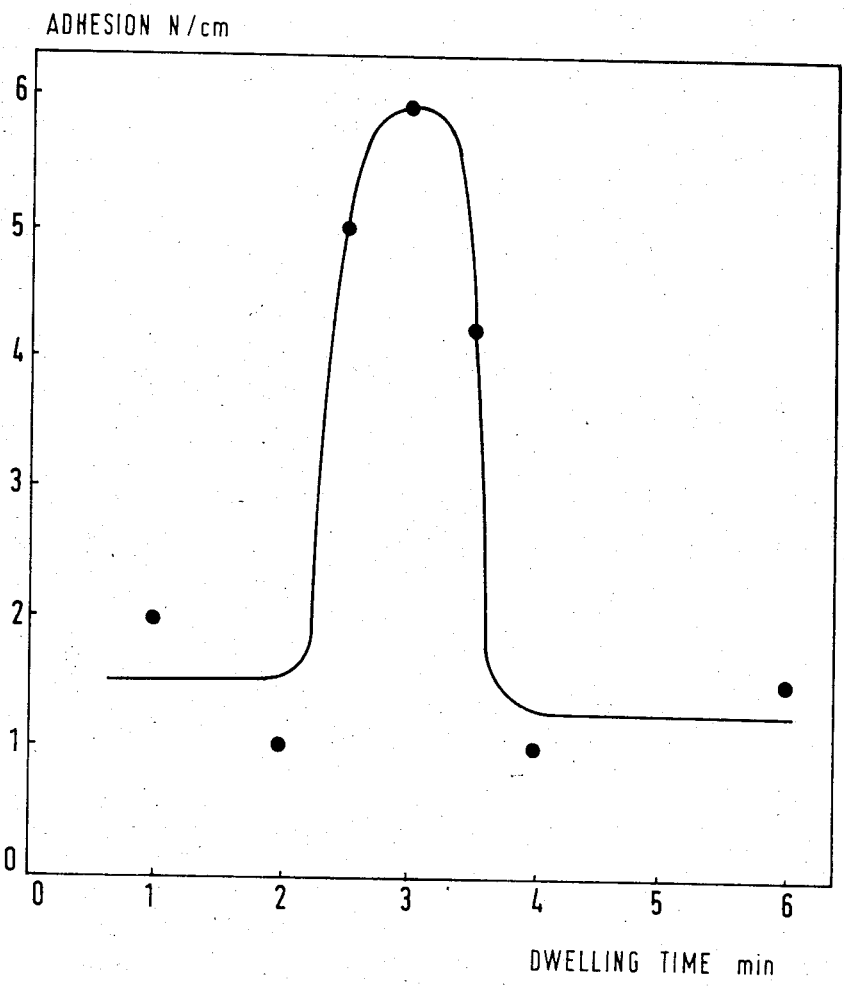

COMPOUND FILM CONTAINING OLEFIN

BACKGROUND OF THE INVENTION

The present invention concerns a compound film containing olefin, wherein at least one polyolefin layer has good adhesiveness to polymers containing polar radicals, such as nylon, polyester and polyolefins.

One of the well-known drawbacks of polyolefins, such as polyethylene and polypropylene, is that their adhesiveness to metals, and to other polymers, is poor. Many methods have been applied in attempts to improve the adhesiveness. As examples may be mentioned the treatment of the polyolefins' surface with acids, with a flame or a corona discharge, or the use of adhesive agents, such as ethylene-acrylic acid copolymers interposed between the polyolefin and the substrate in the case. The adhesiveness of polyolefins to polar polymers has also been improved by admixing to them polymers which possess good adhesiveness, or by copolymerizing polyethylene with monomers containing functional radicals.

Functional radicals improving the adhesiveness may also be obtained by grafting, to the polyolefin chains, various unsaturated polar compounds, such as acrylic acid, methacrylic acid and their derivatives (such as salts), and maleic anhydride.

Very high requirements are nowadays imposed on packaging products especially by the packaging of foodstuffs in plastic films. Therefore, the films intended to be used in packaging food may contain even a great number of separate layers, each one selected to endow the products with a certain characteristic, for instance impermeability to various gases and to water vapor, permeability to certain gases, joinability by seaming etc. In frequent instances a given layer is only required to enable layers with poor adhesiveness, such as polyolefin layers for instance, to be made adherent to other layers containing polar polymers.

The methods employed with a view to improving the adhesiveness of polyolefin layers are encumbered by many drawbacks. For instance, grafting of maleic anhydride or of acrylic acid to polyolefin is risky from the viewpoint of foodstuff applications because said substances can be considered toxic. Furthermore, for instance the adding of maleic anhydride in connection with film extruding operations is difficult and implies the use of solvents.

SUMMARY OF THE INVENTION

The object of the present invention is a compound film wherein at least one polyolefin layer possesses good adhesiveness to polymers containing polar radicals. A further object of the invention is a compound film product in which the adhesive layer contains no substances detrimental to health and which is easy to manufacture. Furthermore one object of the invention is a compound film in which the properties of the adhesive layer are easy to control during the conversion process.

The polyolefin-containing compound film of the invention in which at least one polyolefin layer has good adhesiveness to polymers containing polar radicals is characterized in that said layer consists of polyolefin which has been modified by grafting 0.01 to 10% of unsaturated alkoxysilane.

The silane to be grafted to polyolefins may be any unsaturated alkoxysilane suited to the purpose. Such are, e.g., vinyl trimethoxysilane, vinyl triethoxysilane, vinyl tris(betamethoxyethoxy)silane or gamma methacryloxypropyltrimethoxysilane.

DESCRIPTION OF THE PREFERRED EMBODIMENTS

Grafting of polyolefins with silanes is not new in itself. Originally, hydrolysable alkoxysilanes were developed for improving the miscibility of polymers and inorganic fillers (to serve as coupling agents). In such cases, the alkoxy radicals of the silane are hydrolysed to become hydroxy radicals, and thereafter occurs condensation with the hydroxy radicals on the surface of the fillers. These silanes contain, in addition to the alkoxy radicals, one or several radicals having such chemical composition that they mix well with the polymer.

Since the alkoxy radicals or silanes condense by effect of water (and of a catalyst, for instance dibutylstannic dilaurate), silanes have also been introduced in cross-linking technology. This is based on unsaturated alkoxysilane being grafted with the aid of peroxide to the polymer, and cross-linking does not take place until after the end product has been completed, with the aid of water or steam. In this way it becomes possible to machine the polymer at high temperatures without risk of cross-linking; in addition, the cross-linking step is less expensive as regards energy as well as investment costs. When silanes are used for cross-linking, a condensation catalyst must always be present. In one of the procedures, two polymer mixes (LDPE grafted with silane and LPDE containing catalyst) are added into a conventional cable manufacturing extruder, while in another procedure all raw material components are added directly into a cable extruder of special design, where the grafting takes place. It has been noted in the manufacturing of cables by said procedures that certain silane-grafted LDPE brands adhere well to aluminium.

However, the adhesiveness to polymers containing polar radicals of polyolefins modified as described is poor, and therefore they are not fit to be used in a compound film product according to the invention. This is because the polymers modified as above described have been treated too long at the processing temperature, whereby the grafting reaction has proceeded to its finish. It has been observed in the present invention that in the manufacturing of a silane-modified adhesive layer, the heat treatment must be minimized and grafting must not be allowed to take place until the product conversion step. This is an essential difference from the silane grafting procedure of prior art, and its consequence is that polyolefin modified with silane as taught by the invention has good adhesiveness to polymers containing polar radicals.

When manufacturing the modified polyolefin required in the compound film of the invention, as radical former for the grafting is used any suitable substance which is able to form radicals at the processing temperature, i.e., at the manufacturing of the compound film constituting the end product, but not while the raw material mixture is being prepared. Suitable radical formers are, for instance, peroxide compounds such as dicumyl peroxide. The required quantity of radical former is between 0.01 and 0.5 percent by weight of the weight of the modified polyolefin.

The raw material mix is prepared either by preparing a mechanical mixture of polyolefin, silane and peroxide, or by producing from said substances a compound mass by mixing together the melted polyolefin, silane and peroxide. In the first case, the manufacturing may take place at room temperature by mixing together polyolefin granules, liquid silane and peroxide and by mixing mechanically long enough to accomplish mixing. In the latter case care must be taken not to allow the temperature of the mix to rise to such height that the peroxide that is used would begin to decompose. In practice, the mixing temperature of the compound mix has to be limited to be within 115° to 170° C.

The adhesiveness to polar polymers of the silane-modified polyolefin can be controlled by varying the silane quantity, the quantity of radical former and at the end product manufacturing step, the temperature and time, and thereby influencing the grafting of the silane. It is thus made possible to achieve any desired degree of adhesiveness, depending on the application.

There are various possibilities as to the manufacturing of the compound film of the invention. Thus, for instance, silane-modified polyolefin may be combined in molten state with a polymer film containing polar radicals. According to another alternative, the modified polymer as well as the polymer containing polar radicals is in molten state, and according to a third alternative a film made of polyolefin modified as taught by the invention is combined in molten state with a film of polymer containing polar radicals. In every case, the silane grafting shall not take place before this step, of which the temperature and dwelling time are so adjusted that the silane has time to be grafted. In practice, the time needed for the manufacturing of the final compound product is less than 4 minutes, preferably 2-3 minutes.

A laminated product containing polyolefin according to the invention may be used in various ways in applications in which is implied the simultaneous use of polyolefins and of polymers containing polar radicals, in one higher of lower density polyethylene, polypropylene, or various copolymers of ethylene and propylene for instance with vinyl acetate, or mixtures or those mentioned above.

The invention is more closely described in the following, nonrestrictive examples.

EXAMPLE 1

Strips were produced in a Brabender extruder with screw diameter 19 mm, length 20 L/D and compression ratio 3/1. The temperature was 130° C./200° C. and screw's speed of rotation, 20 r.p.m. The dwelling time was then about 2 min. The polyolefin was low density polyethylene (0.922 g/cm$^3$) with melt index 4 g/10 min. The radical former used was dicumyl peroxide (DCP) and as silanes were used vinyl trimethoxysilane (Sil-1), vinyl triethoxysilane (Sil-2), vinyl tris(betamethoxyethoxy)silane (Sil-3) and gamma methacryloxypropyltrimethoxysilane (Sil-4).

The strips were pressed into sheets of 1 mm thickness, at 140° C. Thereafter, a polyamide film and the silane-modified polyolefin sheet were pressed together. In three cases, a polyester film (PET) was substituted for polyamide. The temperature at the press joining was 200° C. and the pressure, 7.8 MPa. From the plates thus produced, five test specimens were cut, having width 20 mm and length 125 mm. The specimens were stored during 3 days at 23° C. and 50% R.H.

The loading strength reflecting the adhesion was measured with an "In stron" tension testing machine, using pulling rate 50 mm/min. From the recorder graph was read the force required to detach the different layers, whence could be calculated the adhesion in Ncm$^{-1}$.

The table below states some test results obtained with the silane-modified polyolefins. The reference is unmodified polyethylene.

| Polymer | DCP, % | Silane, % | Melt index, g/10 min. | Density, g/cm$^3$ | Adhesion, N/cm | | | Pressing temp., °C. |
|---|---|---|---|---|---|---|---|---|
| | | | | | Al | PA | PET | |
| 1. LPDE | 0 | 0 | 3,9 | 0,920 | 0 | 0 | 0 | 200 |
| 2. LPDE | 0,05 | 2,5 Sil-1 | 2,5 | 0,924 | 25 | 10 | 10 | 200 |
| 3. LPDE | 0,1 | 5,0 Sil-1 | 1,7 | 0,923 | 33 | 8 | 20 | 200 |
| 4. LPDE | 0,05 | 2,5 Sil-2 | 2,8 | 0,922 | 30 | 2 | — | 200 |
| 5. LPDE | 0,05 | 2,5 Sil-3 | 2,6 | 0,923 | 18 | 9 | — | 200 |
| 6. LPDE | 0,05 | 2,5 Sil-4 | 3,9 | 0,923 | 0 | 5 | — | 200 |
| 7. LPDE | 0,05 | 2,5 Sil-1 | 0,1 | 0,924 | 18 | 5 | — | 200 |
| 8. LPDE | 0,05 | 2,5 Sil-1 | 2,5 | 0,924 | 2 | 0 | 3 | 140 |
| 9. LPDE | 0,05 | 2,5 Sil-1 | 2,5 | 0.924 | 94 | 13 | 40 | 300 | and the same compound film product. One way is to use a polyolefin layer modified as taught by the invention, directly to coat therewith nylon, polyester or common polyolefin. Another alternative is to use a silane-modified polyolefin layer as an intermediate or adhesive layer when coating nylon tubes, bottles and other objects. Further may be mentioned the compound films of nylon and modified polyolefin, compound films of polyester and modified polyolefin, and compound films of common polyolefin and modified polyolefin. The modified polyolefin layer may in these instances be either the outer, inner or intermediate layer in a multi-ply product, depending on the intended use of the product.

The modified polyolefin to be used in laminated products of the invention containing polyolefin may be The results demonstrate that the adhesion of the polyolefin to nylon and polyester may be regulated to a certain extent by varying, for instance, the silane quantity and the pressing temperature. Unmodified polyolefin did not adhere at all to the polyamide or polyester films.

EXAMPLE 2

Tests sheets were prepared, and the adhesiveness tested, as in Example 1, except that the modified polyethylene was high density polyethylene and ethylene-vinyl acetate copolymer (EVA) with vinyl acetate content 20%. On testing the adhesiveness of these films to nylon, the following results were obtained:

| Polymer | DCP, % | Silane, % | Melt, index, g/10 min. | Density, g/cm³ | Adhesion, N/cm PA | Pressing temp., °C. |
| --- | --- | --- | --- | --- | --- | --- |
| 1. HDPE | 0,05 | 2,5 Sil-1 | 0,1 | 0,957 | 0 | 200 |
| 2. HDPE | 0,1 | 5,0 Sil-1 | 0,1 | 0,957 | 12 | 300 |
| 3. EVA | 0,05 | 2,5 Sil-1 | 0,1 | 0,949 | 34 | 200 |

The results reveal that HDPE requires a larger peroxide and silane quantity and higher pressing temperature than LDPE, for obtaining good adhesiveness to nylon.

EXAMPLE 3

The influence of the extruder dwelling time on the adhesiveness of silane-modified LDPE was studied. The polyethylene used was the same as in Example 1. The silane quantity used was 1.5% of Sil-1, and the dicumyl peroxide quantity, 0.03%. The temperature profile in the Brabender extruder was 130° C./200° C., and by changing the speed of rotation of the screw, the dwelling times of 1, 2, 2.5, 3, 3.5, 4 and 6 min. were obtained. The FIGURE reveals that with this formulation, optimum adhesion to nylon is obtained when the dwelling time is 3 min.

EXAMPLE 4

To the LDPE polyethylene of Example 1 were added 2.5% Sil-1 and 0.05% DCP, as a dry mixture, and a 50µ blown film was produced.

The extruder used was a 45 mm 25 L/D Bandera. The initial temperature was 130° C. and the end temperature, 200° C. The speed of rotation of the screw was 79 r.p.m. and the nozzle size, 150 mm/1 mm. The following characteristics of the film were measured and compared with the corresponding values of the base polymer.

| Characteristic | LDPE | LDPE |
| --- | --- | --- |
| | — | 2,5% Sil-L, 0,05% DCP |
| Opacity, % | 5,6 | 6,2 |
| Gloss, % | 11,3 | 12,4 |
| Ultimate tensile strength, M.D./C.D., MPa | 14,1/12,5 | 16,8/16,7 |
| Yield point M.D./C.D., MPa | 10,8/9,9 | 11,4/10,4 |
| Ultimate elongation M.D./C.D., % | 340/470 | 490/610 |
| Drop test g/50% broken | 82 | 69 |
| Adhesion Al/PA, N/cm | 0/0 | 13/8 |

M.D.=Machine direction of film
C.D.=Cross-machine direction of film
Opacity-ASTM D 1003
Gloss-ASTM D 523
Ultimate tensile strength-ASTM D 882
Yield point-ASTM D 882
Ultimate elongation-ASTM D 882
Drop test value-ASTM D 1709

I claim:

1. A multilayer compound film including at least one layer of polyolefin in contact with a polymer containing polar radicals, said polyolefin layer having between 0.01-10% of an unsaturated alkoxysilane grafted thereon and wherein the alkoxy groups thereof are unhydrolyzed and therefore reactable to adhere the polyolefin to the polymer containing the polar radicals.

2. The film of claim 1, wherein the silane is selected from the group consisting of vinyl trimethoxysilane, vinyl triethoxysilane, vinyl tris(betamethoxyethoxy)silane, and gamma methacryloxypropyltrimethoxysilane, and mixtures thereof.

3. The film of claim 1, wherein the polymer is polyamide, polyester, polyethylene, or polypropylene.

4. The film of claim 2, wherein the polyolefin is polyethylene.

5. The film of claim 2, wherein the polyolefin is ethylvinyl acetate copolymer.

6. A multilayer compound film including at least one layer of polyolefin in contact with a polymer containing polar radicals, said polyolefin layer being modified by
    (a) admixing between 0.01-10% of an unsaturated alkoxysilane and 0.01-0.5% of a radical former, under conditions where no grafting of the silane takes place; and
    (b) then grafting the alkoxysilane onto the polyolefin to modify the same, and forming a multilayer compound film.

7. The film of claim 6, wherein the admixing in step (a) is carried out at a temperature of 115°-170° C.

8. The film of claim 6, wherein step (b) is carried out in less than about four minutes.

9. The film of claim 8, wherein step (b) is carried out in 2-3 minutes.

10. The film of claim 6, wherein the radical former is dicumyl peroxide.

11. The film of claim 6, additionally comprising the step of
    maintaining temperature in step (a) below the decomposition temperature of the radical former.

12. The film of claim 6, wherein, in step (b), the film is formed by combining the silane-modified polyolefin in molten state with a film of the polymer containing the polar radicals.

13. The film of claim 6, wherein in step (b) both the modified polyolefin and the polymer containing the polar radicals are combined in molten form to form the multi-layer compound film.

14. The film of claim 6, wherein in step (b) a film of the modified polyolefin is combined with a film of the polymer containing the polar radicals, to form the multilayer compound film.

15. A method of forming a multilayer compound film including at least one layer of polyolefin in contact with a polymer containing polar radicals, said method comprising the steps of
    (a) admixing between 0.01-10% of an unsaturated alkoxysilane and 0.01-0.5% of a radical former, under conditions where no grafting of the silane takes place,
    (b) then grafting the thus-admixed alkoxysilane onto the polyolefin layer to be modified, and
    (c) forming a multilayer compound film.

16. The method of claim 15, wherein the admixing in step (a) is carried out at a temperature of 115°-170° C.

17. The method of claim 15, wherein step (b) is carried out in less than about four minutes.

18. The method of claim 17, wherein step (b) is carried out in 2-3 minutes.

19. The method of claim 15, additionally comprising the step of maintaining temperature in step (a) below the decomposition temperature of the radical former.

20. The method of claim 15, wherein the alkoxy groups of the silane remain unhydrolyzed.

* * * * *